US011220588B2

(12) United States Patent
Fantoni et al.

(10) Patent No.: US 11,220,588 B2
(45) Date of Patent: Jan. 11, 2022

(54) FLUOROELASTOMER COMPOSITION

(71) Applicant: SOLVAY SPECIALTY POLYMERS ITALY S.P.A., Bollate (IT)

(72) Inventors: Matteo Fantoni, Vanzaghello (IT); Marco Avataneo, Milan (IT); Stefano Bossolo, Parabiago (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 0 days.

(21) Appl. No.: 15/578,126

(22) PCT Filed: May 30, 2016

(86) PCT No.: PCT/EP2016/062132
§ 371 (c)(1),
(2) Date: Nov. 29, 2017

(87) PCT Pub. No.: WO2016/193202
PCT Pub. Date: Dec. 8, 2016

(65) Prior Publication Data
US 2018/0155524 A1 Jun. 7, 2018

(30) Foreign Application Priority Data

May 29, 2015 (EP) .................................... 15169950

(51) Int. Cl.
| | |
|---|---|
| *C08K 5/14* | (2006.01) |
| *C08K 5/205* | (2006.01) |
| *C08K 5/21* | (2006.01) |
| *C08K 5/3492* | (2006.01) |
| *C08K 5/3495* | (2006.01) |
| *C08K 5/405* | (2006.01) |
| *C08K 5/00* | (2006.01) |
| *C08K 5/39* | (2006.01) |

(52) U.S. Cl.
CPC .............. *C08K 5/14* (2013.01); *C08K 5/0025* (2013.01); *C08K 5/205* (2013.01); *C08K 5/21* (2013.01); *C08K 5/3492* (2013.01); *C08K 5/3495* (2013.01); *C08K 5/39* (2013.01); *C08K 5/405* (2013.01)

(58) Field of Classification Search
CPC ........ C08K 5/14; C08K 5/0025; C08K 5/205; C08K 5/21; C08K 5/3492; C08K 5/3495; C08K 5/09; C08K 5/405; C08J 3/24; C08J 3/243; C08L 27/12
See application file for complete search history.

(56) References Cited

U.S. PATENT DOCUMENTS

| | | | |
|---|---|---|---|
| 4,035,565 A | 7/1977 | Apotheker et al. | |
| 4,243,770 A | 1/1981 | Tatemoto et al. | |
| 4,564,662 A | 1/1986 | Albin | |
| 4,694,045 A | 9/1987 | Moore | |
| 4,745,165 A | 5/1988 | Arcella et al. | |
| 4,943,622 A | 7/1990 | Naraki et al. | |
| 5,159,026 A | 10/1992 | Masatoshi | |
| 5,173,553 A | 12/1992 | Albano et al. | |
| 6,281,296 B1 * | 8/2001 | MacLachlan ............ C08K 5/18 525/326.3 |
| 2004/0236028 A1 | 11/2004 | Hung et al. | |
| 2005/0282969 A1 | 12/2005 | Comino et al. | |
| 2007/0208142 A1 | 9/2007 | Adair et al. | |
| 2008/0116603 A1 | 5/2008 | Grootaert et al. | |

FOREIGN PATENT DOCUMENTS

| | | |
|---|---|---|
| DE | 3938175 A1 | 6/1990 |
| DE | 4023657 A1 | 1/1991 |
| EP | 0199138 A2 | 10/1986 |
| EP | 0769520 A1 | 4/1997 |

OTHER PUBLICATIONS

DE3938175 machine translation.*

* cited by examiner

*Primary Examiner* — Irina S Zemel
*Assistant Examiner* — Jeffrey S Lenihan
(74) *Attorney, Agent, or Firm* — Osha Bergman Watanabe & Burton LLP

(57) ABSTRACT

The invention pertains to a (per)fluoroelastomer composition comprising at least one (per)fluoroelastomer comprising iodine and/or bromine atoms, at least one polyunsaturated compound, at least one organic peroxide and at least one organic compound selected from the group consisting of (thio)urea compounds, cyclic addition products of ammonia or primary amine and aldehyde; (thio)carbamates.

24 Claims, No Drawings

FLUOROELASTOMER COMPOSITION

CROSS-REFERENCE TO RELATED APPLICATION

This application is a U.S. national stage entry under 35 U.S.C. § 371 of International Application No. PCT/EP2016/062132 filed May 30, 2016, which claims priority to European patent application No. 15169950.1 filed on May 29, 2015. The entire contents of these applications are explicitly incorporated herein by this reference.

TECHNICAL FIELD

This invention pertains to certain (per)fluoroelastomer curable blends, to a method of using the same for fabricating shaped articles and to cured articles there from.

BACKGROUND ART (Per)fluoroelastomers are a class of high-performance materials with a diverse range of applications encompassing O-rings, valve stem seals, shaft seals, gaskets and hoses in chemical processing industry (CPI).

It is also understood that properties of final vulcanized parts made from (per)fluoroelastomers are greatly influenced by the curing system employed, with peroxide-based curing being considered as delivering higher performances over bis-phenol-based ionic curing.

In peroxide-based curing, a peroxide is added to the (per)fluoroelastomer comprising, either as pendant groups in recurring units of the main chain, or as end-groups, certain cure sites able to react under radical condition, and to a polyfunctional unsaturated compound. Under the effect of heat, the peroxide generates radicals which promote reactions of the fluoroelastomer chain, activated through the cure sites, with the polyfunctional unsaturated compound for yielding a cured mass, with chemically interconnected polymer chains.

Nevertheless, achieving high thermal rating remains a challenging target, even when using peroxide-based formulations.

In this field there is hence a continuous quest for (per) fluoroelastomer curable blends offering an advantageous balance of properties, and more specifically high thermal stability and outstanding steam resistance, and which are easily accessible at reasonable costs.

Documents DE 3938175 21 Jun. 1990, DE 4023657 31 Jan. 1991 and U.S. Pat. No. 5,159,026 27 Oct. 1992 all comprise similar teachings and are directed to the addition of certain sulphur-containing compounds as additives to peroxide curable iodine/bromine containing fluoroelastomer compounds, said sulphur containing compounds being effective in suppressing generation of toxic methyl iodide/methyl bromide at curing temperatures. More particularly, documents DE 3938175 21 Jun. 1990, DE 4023657 31 Jan. 1991 mention, among sulphur-containing compounds, suitability of thiouram compounds. Document U.S. Pat. No. 5,159,026 27 Oct. 1992 discloses, among said sulphur-containing compounds the class of thioureas, including N, N'-diphenylthiourea, N, N'-diethylthiourea, trimethylthiourea, tributylthiourea, tetramethylthiourea, tetraethylthiourea, 1, 3-bis(dimethylaminopropyl)-2-thiourea, etc. In all these documents, the polyunsaturated crosslinking agents taught for use in the thereby disclosed formulations are tri(metha)allyl isocyanurate, tri(metha)allylcyanurate, triallyl trimellitate, N, N'-m-phenylenebismaleimide, diallyl phthalate, tris(diallylamine)-s-triazine, triallyl phosphite, (di)ethyleneglycol diacrylate, neopentylglycol diacrylate.

Document US 20040236028 (DUPONT DOW ELASTOMERS) 25 Nov. 2004 relates to a curable fluoroelastomer composition comprising, inter alia, a fluoroelastomer copolymer, preferably fluoroelastomer containing iodine end groups; and a curing agent comprising an organic peroxide and a polyfunctional coagent. The polyfunctional coagent disclosed in paragraph are triallylisocyanurate, tri(methallyl)isocyanurate, tris(diallylamine)-s-triazine; triallyl phosphite; N,N-diallyl acrylamide; hexaallyl phosphoramide; N,N, N',N'-tetraallyl tetraphthalamide; N,N, N',N'-tetraallyl malonamide; trivinyl isocyanurate; 2,4,6-trivinyl methyltrisiloxane; tri(5-norbornene-2-methylene)cyanurate. This document further teaches that other curatives may be employed in the compositions of the invention, among which mention is made of amines, and of compounds which decompose to produce ammonia at curing temperatures. Nevertheless, no indication is provided as per the intended technical effect associated to the addition of said additives.

Document US 2005/282969 is directed to a crosslinking system of perfuoroelastomers curable by peroxidic way comprising: as crosslinking agent, a bis-olefin having general formula

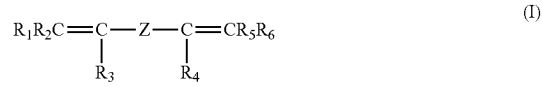

wherein: $R_1$, $R_2$, $R_3$, $R_4$, $R_5$, $R_6$, equal to or different from each other, are H or $C_1$-$C_5$ alkyls; Z is a $C_1$-$C_{18}$ linear or branched alkylene or cycloalkylene radical, optionally containing oxygen atoms, or a (per)fluoropolyoxyalkylene radical; the bis-olefin amount, expressed in percent by weight on the total of polymer, being from 0.6 percent to 1.8 percent; peroxides for the peroxidic curing, capable to generate radicals by heating, in an amount from 0.2 percent to 1.3 percent by weight on the polymer. This document does not teach nor suggest the use of ammonia-generating compounds.

Document US 2007/0208142 is directed to a composition comprising: a fluorocarbon polymer, which may comprise iodine cure sites; a radical initiator; a first curing co-agent selected from the group consisting of an allyl cyanurate, an allyl isocyanurate, a methallyl cyanurate, and a methallyl isocyanurate; and a second curing co-agent comprising an organic compound including at least one terminal alkene, with the proviso that the second curing co-agent is not a member of the group of first curing co-agents.

Document EP 0769520 A (AUSIMONT SPA) 23 Apr. 1997 is directed to iodine-containing fluoroelastomers curable by peroxidic route which comprise iodine comprising as curing agent a bis-olefin having general formula:

wherein $R_1$, $R_2$, $R_3$, $R_4$, $R_5$, $R_6$, equal to or different from each other, are H or alkyl $C_1$-$C_5$; Z is a linear or branched alkylenic or cycloalkylenic radical $C_1$-$C_{18}$, optionally containing oxygen atoms, preferably at least partially fluorinated, or a (per)fluoropolyoxyalkylenic radical.

Document US 2008/0116603 is directed to a curable fluoropolymer composition comprising a fluoropolymer comprising interpolymerized units of tetrafluoroethylene, perfluoro(aliphatic vinyl)ether, and a nitrogen-containing cure site monomer; a catalyst to form cross-links with the nitrogen-containing cure site monomer; an organic peroxide; a co-agent to participate in a peroxide cure; and a hydrotalcite compound. The said catalysts, which are taught as effective for the curing of nitrile groups, include notably ammonia generating compounds such as urea; hexamethylenetetramine (urotropin); carbamates; $HCF_2CF_2CH(CH_3)OCONH_2$; urea hydrochloride; thiourea. This document does not disclose the combination of a bis-olefin and an urea-generating compound for the peroxide curing of an iodine-containing fluoroelastomer.

Document U.S. Pat. No. 4,243,770 is directed to cross-linkable fluoroelastomer having iodine end groups; The said polymers are crosslinkable in the presence of a crosslinkable source, which can be notably organic peroxides, polyamines, polyhydroxy compounds, and polythiol compounds. In combination with peroxide, a co-cross linking agent, any one having a reactivity to peroxy radical and polymer radical may be effectively employed in principle. Preferable examples are polyfunctional compounds such as triallyl cyanurate, triallyl isocyanurate, triacrylformal, triallyl trimellitate, N,N'-m-phenylenebismaleimide, dipropargyl terephthalate, diallyl phthalate, tetraallyl terephthalamide, polybutadiene, etc—but no mention is made of a bis-olefin. The polyamine compound may be e.g. ethylenediamine carbamate, hexamethylenediamine carbamate, 4,4'-diaminocyclohexylmethane carbamate, Schiffs bases such as N,N'-dicinnamylidene-1,6-hexamethylenediamine, diphenylguanidine, di-O-triguanidine, diphenylthiourea, 2-mercaptoimidazoline, etc. Nevertheless, these compounds are not taugh for being used in combination with peroxide curing, but rather in alternative thereto.

SUMMARY OF INVENTION

The Applicant has now found that a particular combination of cross-linking agents and certain organic compound able to generate ammonia or amine through decomposition during curing, in given amounts, is effective in the peroxide curing of certain (per)fluoroelastomers either perfluorinated or having an amount of hydrogenated sequences below a certain threshold, and provides for cured gum possessing a particularly favourable balance of thermal resistance and availability/cost, so that target performances for high temperature ratings can be achieved through the use of this curative at competitive costs.

The invention thus pertains to a (per)fluoroelastomer composition comprising:
- at least one (per)fluoroelastomer [fluoroelastomer (A)], said fluoroelastomer (A) comprising iodine and/or bromine atoms and having a backbone comprising:
- recurring units derived from tetrafluoroethylene (TFE);
- recurring units derived from at least one perfluorinated monomer selected from the group consisting of:
- perfluoroalkylvinylethers complying with formula $CF_2=CFOR_{f1}$ in which $R_{f1}$ is a $C_1$-$C_6$ perfluoroalkyl (monomers of this type being referred to, herein after, as PAVE), e.g. —$CF_3$, —$C_2F_5$, —$C_3F_7$;
- perfluoro-oxyalkylvinylethers complying with formula $CF_2=CFOX_0$, in which $X_0$ can be (i) a $C_1$-$C_{12}$ perfluorooxyalkyl having one or more ether groups, e.g. —$C_2F_5$—O—$CF_3$; or (ii) a group of formula —$CF_2OR_{f2}$ in which $R_{f2}$ is a $C_1$-$C_6$ perfluoroalkyl, e.g. —$CF_3$, —$C_2F_5$, —$C_3F_7$ (monomers of this type being referred to, herein after, as MOVE);
- optionally, recurring units derived from vinylidene fluoride (VDF) in an amount of up to 30% by moles, with respect to the total moles of recurring units; and
- optionally, recurring units derived from at least one perfluorinated $C_3$-$C_8$ alpha-olefin, in an amount of up to 5% moles;
- optionally, recurring units derived from at least one fluorine-free alpha-olefin, in an amount of up to 10% moles;
- from 0.5 to 5 weight parts, per 100 parts by weight of said fluoroelastomer (A), of at least one polyunsaturated compound selected from the group consisting of bis-olefins [bis-olefin (OF)] having general formula:

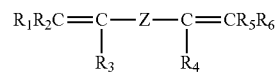

wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or Z is a (per)fluoropolyoxyalkylene radical;
- from 0.1 to 3 weight parts, per 100 parts by weight of said fluoroelastomer (A), of at least one organic peroxide;
- from 0.1 to 10 weight parts, per 100 parts by weight of said fluoroelastomer (A), of at least one organic compound [compound (C)] selected from the group consisting of:
(i) (thio)urea compounds of formula (U):

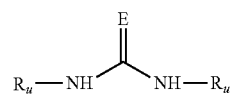

wherein E is O or S, preferably E is O, and each of $R_u$, equal to or different from each other, is independently selected from the group consisting of hydrogen and $C_1$-$C_6$ hydrocarbon groups (in particular $C_1$-$C_6$ alkyl groups);
(ii) cyclic addition products of ammonia or primary amine and aldehyde;
(iii) (thio)carbamates of formula (C):

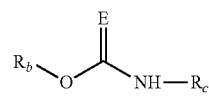

wherein E is oxygen or sulphur; $R_b$ is a $C_1$-$C_{36}$ hydrocarbon group, and Rc is H or a $C_1$-$C_6$ alkyl group.

The Applicant has surprisingly found that the use of the organic compound (C) as above detailed, in a peroxide-curable fluoroelastomer formulation, in combination with bis-olefin-type crosslinking agents, despite the presence of moieties of formula —$CF_2$—$CF(OR_F)$—, with $R_F$ being perfluoro(oxy)alkyl, generally known as undergoing base-catalyzed decomposition phenomena, is surprisingly effective in delivering outstanding mechanical and sealing properties, in particular after exposure at temperatures as high as 300° C.

Indeed, the Applicant believes, without being bound by this theory, that the above listed compounds are generating at appropriate curing/post-curing temperature ammonia and/or amines which are positively interacting during the said processes for delivering improved performances.

The bis-olefin (OF) is preferably selected from the group consisting of those complying with formulae (OF-1), (OF-2) and (OF-3):

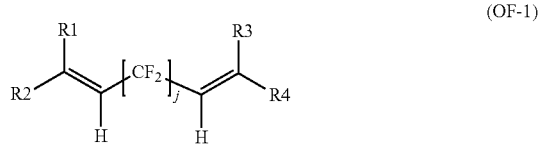

(OF-1)

wherein j is an integer between 2 and 10, preferably between 4 and 8, and R1, R2, R3, R4, equal or different from each other, are H, F or $C_{1-5}$ alkyl or (per)fluoroalkyl group;

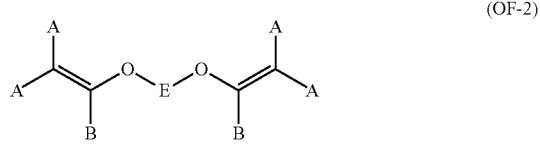

(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C$=$CF$—$O$—$(CF_2)_5$—$O$—$CF$=$CF_2$.

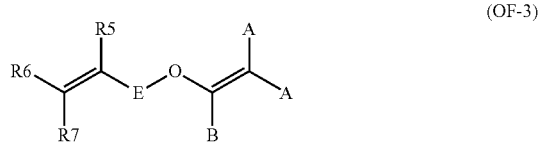

(OF-3)

wherein E, A and B have the same meaning as above defined; R5, R6, R7, equal or different from each other, are H, F or $C_{1-5}$ alkyl or (per)fluoroalkyl group.

The bis-olefin (OF) is more preferably a compound of formula (OF1), as above detailed, and even more preferably a compound of formula $CH_2$=$CH$—$(CF_2)_n$—$CH$=$CH_2$, with n being an integer in the range of 4 to 6.

The amount of polyfunctional compound ranges from 0.5 to 5 weight parts per 100 parts by weight of fluoroelastomer (A).

For enabling obtaining sufficient cross-linking, it is generally preferred to have in the composition amounts of polyfunctional compound of at least 1, preferably at least 1.2 weight parts per 100 parts by weight of fluoroelastomer (A).

Still, useful amounts of polyfunctional compound are of generally less than 5, more preferably less than 4, still more preferably less than 3 weight parts per 100 parts by weight of fluoroelastomer (A).

For the purposes of this invention, the term "fluoroelastomer" [fluoroelastomer (A)] is intended to designate a fluoropolymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Fluoroelastomers (A) are in general amorphous products or products having a low degree of crystallinity (crystalline phase less than 20% by volume) and a glass transition temperature (Tg) below room temperature. In most cases, the fluoroelastomer (A) has advantageously a Tg below 10° C., preferably below 5° C., more preferably 0° C.

The fluorine-free alpha-olefin is generally selected from the group consisting of ethylene (E), propylene (P), 1-butene, 1-hexene, with E being generally preferred.

The perfluorinated $C_3$-$C_8$ alpha-olefin is generally selected from the group consisting of hexafluoropropylene (HFP), perfluoro-1-butene, with HFP being generally preferred.

The fluoroelastomer (A) is preferably selected among those having a backbone comprising (preferably consisting essentially of):
  recurring units derived from TFE in an amount of 30 to 70% moles;
  recurring units derived from at least one perfluorinated monomer selected from the group consisting of PAVE and MOVE monomers, as above detailed, in an amount of 25 to 40% moles;
  optionally, recurring units derived from VDF in an amount of 1 to 25% moles;
  optionally, recurring units derived from ethylene (E) in an amount from 0 to 5% moles;
  optionally, recurring units derived from hexafluoropropylene (HFP) in an amount from 0 to 5% moles;
  optionally, recurring units derived from at least one bis-olefin [bis-olefin (OF)] having same features, as above detailed.

Defects or other impurities might be comprised in the fluoroelastomer (A) without this substantially affecting its properties.

Among specific monomer compositions of fluoroelastomers (A) suitable for the purpose of the invention, mention can be made of fluoroelastomers having the following monomer compositions (in mol %):
(i) tetrafluoroethylene (TFE) 50-80%, perfluoroalkyl vinyl ethers (PAVE) 20-50%, bis-olefin (OF) 0-5%;
(ii) tetrafluoroethylene (TFE) 20-70%, perfluoro-oxyalkyl-vinylether (MOVE) 30-80%, perfluoroalkyl vinyl ethers (PAVE) 0-50%, bis-olefin (OF) 0-5%.
(iii) tetrafluoroethylene (TFE) 40-70%, perfluoroalkyl vinyl ethers (PAVE) 20-50%, vinylidene fluoride (VDF): 10-30%; bis-olefin (OF): 0-5%; hexafluoropropylene (HFP): 0-5%;
(iv) tetrafluoroethylene (TFE) 40-69%, perfluoroalkyl vinyl ethers (PAVE) 20-49%, vinylidene fluoride (VDF): 10-30%; ethylene (E): 1-5%; bis-olefin (OF) 0-5%; hexafluoropropylene (HFP): 0-5%.

The fluoroelastomer (A) can be prepared by any known method, such as emulsion or micro-emulsion polymerization, suspension or micro-suspension polymerization, bulk polymerization and solution polymerization.

According to certain preferred embodiments of the invention, the fluoroelastomer (A) comprises iodine and/or bromine atoms; the selection among iodine/bromine is not particularly critical, provided that they ensure adequate reactivity in curing. Iodine is nevertheless generally preferred.

These iodine or bromine atoms can be comprised in the fluoroealstomer (A) as pending groups bound to the backbone of the fluoroelastomer (A) polymer chain (by means of incorporation in the fluoroelastomer (A) chain of recurring units derived from monomers having iodine and/or bromine atoms (referred to as cure-site containing recurring units) and/or can be comprised as terminal groups of said polymer chain.

Among cure-site containing recurring units, mention can be notably made of (CSM-1) iodine or bromine containing monomers of formula:

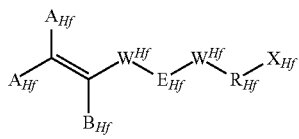

wherein each of $A_{Hf}$, equal to or different from each other and at each occurrence, is independently selected from F, and Cl; $B_{Hf}$ is any of F, Cl, and $OR^{Hf}_B$, wherein $R^{Hf}_B$ is a branched or straight chain perfluoroalkyl radical; each of $W^{Hf}$ equal to or different from each other and at each occurrence, is independently a covalent bond or an oxygen atom; $E_{Hf}$ is a perfluorinated divalent group having 2 to 10 carbon atom; $R_{Hf}$ is a branched or straight chain perfluorinated alkyl radical; and $X_{Hf}$ is a halogen atom selected from the group consisting of Iodine and Bromine.

Among cure-site containing monomers of type (CSM1), preferred monomers are those selected from the group consisting of:
(CSM1-A) iodine-containing perfluorovinylethers of formula:

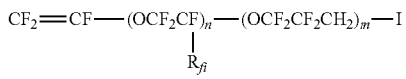

with m being an integer from 0 to 5 and n being an integer from 0 to 3, with the provisio that at least one of m and n is different from 0, and $R_{fi}$ being F or $CF_3$; (as notably described in U.S. Pat. No. 4,745,165 (AUSIMONT SPA) 17 May 1988, U.S. Pat. No. 4,564,662 (MINNESOTA MINING & MFG [US]) 14 Jan. 1986 and EP 199138 A (DAIKIN IND LTD) 29 Oct. 1986); and (CSM-1B) iodine-containing ethylenically unsaturated compounds of formula:

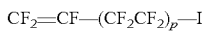

wherein p is an integer from 1 to 5;
(CSM-1C) bromo and/or iodo alpha-olefins containing from 2 to 10 carbon atoms such as bromotrifluoroethylene or bromotetrafluorobutene described, for example, in U.S. Pat. No. 4,035,565 (DU PONT) 12 Jul. 1977 or other compounds bromo and/or iodo alpha-olefins disclosed in U.S. Pat. No. 4,694,045 (DU PONT) 15 Sep. 1987.

According to a first embodiment, the iodine and/or bromine atoms are comprised as pending groups bound to the backbone of the fluoroelastomer polymer chain. The fluoroelastomer according to this embodiment generally comprises recurring units derived from iodine or bromine containing monomers (CSM-1) in amounts of 0.05 to 5 mol per 100 mol of all other recurring units of the fluoroelastomer (A), so as to advantageously ensure iodine and/or bromine weight content to meet requirement for achieving adequate curing rate and crosslinking density.

According to a second preferred embodiment, the iodine and/or bromine atoms are comprised as terminal groups of the fluoroelastomer (A); the perfluoroelastomer according to this embodiment is generally obtained by addition to the polymerization medium during fluoroelastomer manufacture of anyone of:

iodinated and/or brominated chain-transfer agent(s); suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. No. 4,243,770 (DAIKIN IND LTD) 6 Jan. 1981 and U.S. Pat. No. 4,943,622 (NIPPON MEKTRON KK) 24 Jul. 1990); and alkali metal or alkaline-earth metal iodides and/or bromides, such as described notably in U.S. Pat. No. 5,173,553 (AUSIMONT SRL) 22 Dec. 1992.

The fluoroelastomer (A) of the invention comprises advantageously iodine and/or bromine atoms in an amount of 0.001 to 10% wt, with respect to the total weight of the fluoroelastomer (A).

According to this embodiment, for ensuring acceptable reactivity it is generally understood that the content of iodine and/or bromine in the fluoroelastomer (A) should be of at least 0.05% wt, preferably of at least 0.1% weight, more preferably of at least 0.15% weight, with respect to the total weight of fluoroelastomer (A).

On the other side, amounts of iodine and/or bromine not exceeding preferably 7% wt, more specifically not exceeding 5% wt, or even not exceeding 4% wt, with respect to the total weight of perfluoroelastomer (A), are those generally selected for avoiding side reactions and/or detrimental effects on thermal stability.

The curable composition of the invention comprises at least one organic peroxide.

Among most commonly used organic peroxides, mention can be made of dialkyl peroxides, for instance di-tert-butyl peroxide, 2,5-dimethyl-2,5-bis(tert-butylperoxy)hexane, bis(1,1-diethylpropyl)peroxide, bis(1-ethyl-1-methyl propyl)p-eroxide, 1,1-diethylpropyl-1-ethyl-1-methylpropyl-peroxide, 2,5-dimethyl-2,5-bis(tert-amylperoxy)hexane; dicumyl peroxide; dibenzoyl peroxide; di-tert-butyl perbenzoate; bis[1,3-dimethyl-3-(tert-butylperoxy)butyl] carbonate.

The amount of the organic peroxide ranges normally from 0.1 to 10 weight parts per 100 parts by weight of fluoroelastomer (A).

For achieving reasonable curing rates, it is generally preferred to have in the composition amounts of organic peroxide of at least 0.5, preferably at least 0.8 weight parts per 100 parts by weight of fluoroelastomer (A).

Equally, to the sake of efficiency, amount of organic peroxide is of generally less than 3, more preferably less than 2.5, still more preferably less than 2 weight parts per 100 parts by weight of fluoroelastomer (A).

Among suitable compounds (C), (thio)urea compounds, as above detailed, are preferably selected from the group consisting of:

(i-A) (thio)ureas of formula (U-2):

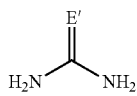

wherein E' is O or S;
cyclic addition products of ammonia or primary amine and aldehyde, as above detailed, are preferably selected from the group consisting of:
(ii-A) cyclic aldehyde adducts trimers of formula (T):

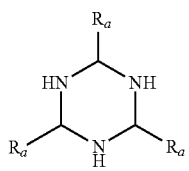

wherein each of $R_a$, equal to or different from each other, is selected from the group consisting of hydrogen and $C_1$-$C_6$ hydrocarbon groups (in particular $C_1$-$C_6$ alkyl groups);
(ii-B) hexamethylene tetramine of formula:

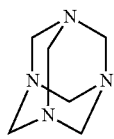

(which is known to be the result of addition of ammonia on formaldehyde); (thio)carbamates, as above detailed, are preferably selected from the group consisting of carbamates of formula (C-1):

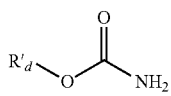

wherein $R'_d$ is a $C_1$-$C_{36}$ hydrocarbon group, preferably is a optionally substituted benzyl group.
Organic compounds (C) which have been found particularly useful in the composition of the present invention are the following:
(C-1) Urea of formula:

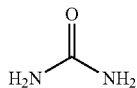

(C-2) Acetaldehyde ammonia trimer of formula:

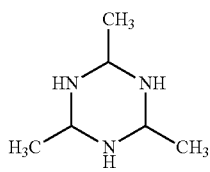

(C-3) Hexamethylenetetramine of formula:

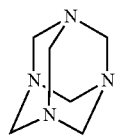

(C-4) Benzyl carbamate of formula:

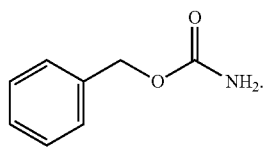 [SMILES: NC(=O)OCc1ccccc1]

The amount of the organic compound (C) ranges normally from 0.1 to 10 weight parts per 100 parts by weight of fluoroelastomer (A).
Optimization of thermal resistance and sealing properties at e.g. 300° C. would generally preferably require to have in the composition amounts of organic compound (C) of at least 0.2, preferably at least 0.5 weight parts per 100 parts by weight of fluoroelastomer (A).
Equally, for avoiding possible side reactions/side effects, it may be useful limiting the amount of organic compound (C) to generally less than 3, more preferably less than 2.5, still more preferably less than 2 weight parts per 100 parts by weight of fluoroelastomer (A).
The fluoroelastomer composition of the invention may additionally comprise other ingredients, such as notably:
(a) a metal compound, generally in amounts of between 1 and 15, and preferably between 2 and 10 weight parts per 100 parts of fluoroelastomer (A), typically selected from the group consisting of (i) oxides and hydroxides of divalent metals, for instance Mg, Zn, Ca or Pb, (ii) salts of a weak acid, for instance Ba, Na, K, Pb, Ca stearates, benzoates, carbonates, oxalates or phosphites, and (iii) mixtures of (i) and (ii);
(b) conventional additives, selected generally from the group consisting of fillers (e.g. carbon black), thickeners, pigmen-ts, antioxidants, stabilizers, processing aids, and the like, in amounts of generally 5 and 150, preferably between 10 and 100 weight parts, more preferably between 20 and 60 weight parts, per 100 parts of fluoroelastomer (A).
It is generally understood that the fluoroelastomer composition of the invention comprises no other ingredients beside those above listed; in other terms, the inventive composition generally consists essentially of the fluoroelastomer (A), the organic peroxide, the polyfunctional compound, the organic compound (C), and optionally metal compounds, and conventional additives, as above detailed.
The invention also pertains to a method of using the fluoroelastomer composition, as above described, for fabricating shaped articles.
The fluoroelastomer composition can be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomer (A) into a finished article made of non-tacky, strong, insoluble, chemically and thermally resistant cured fluoroelastomer.

Finally, the invention pertains to cured articles obtained from the fluoroelastomer composition, as above detailed.

The cured articles can be notably pipes, joints, O-ring, hose, and the like.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

Raw Materials

Fluoroelastomer:

(PFR95HT) TECNOFLON® PFR 95HT, a TFE/perfluoromethylvinylether perfluoroelastomer, comprising recurring units derived from a bis-olefin of formula $CH_2=CH-(CF_2)_6-CH=CH_2$, and iodine end-chains, commercially available from Solvay Specialty Polymers Italy, S.p.A.

Organic Compounds:

the following organic compounds were supplied from commercial sources, and used as received:

(C-1) Urea of formula:

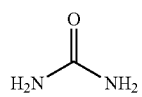

(C-2) Acetaldehyde ammonia trimer tri-hydrate of formula:

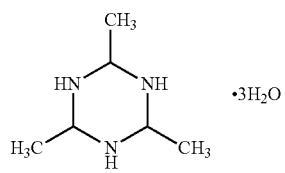

(C-3) Hexamethylenetetramine of formula:

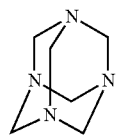

(C-4) Benzyl carbamate of formula:

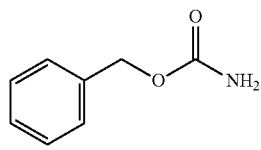 [SMILES: NC(=O)OCc1ccccc1]

The following fillers were used:

(CB-1): Austin Black, commercially available from Coal Fillers Inc;

(CB-2): Carbon Black N990MT, commercially available from Cancarb;

The following polyunsaturated compounds were used:

(BO-1) bis-olefin of formula $CH_2=CH-(CF_2)_6-CH=CHC_2$ commercially available from Solvay Specialty Polymers Italy, S.p.A;

(TAIC) triallylisocyanurate commercially available under tradename DRIMIX®.

The following organic peroxide was used:

(P-1) neat 2,5-dimethyl-2,5-di(t-butylperoxy)hexane ($C_{16}H_{34}O_4$), commercially available as LUPEROX® 101 liquid from Arkema.

Curing, Mechanical and Thermal Resistance Property Determination on Cured Samples Fluoroelastomer was compounded with the additives as detailed in following table in a Brabender mixer. O-rings (size class=214) have been cured from said compositions in a pressed mould 10 minutes at 170° C., and then post-treated/post-cured in an air circulating oven at 200° C. for 8+16 hours. The compression set (C-SET) has been determined on O-ring, specimen standard AS568A (type 214), according to the ASTM D 395, method B, after 70 hours at 300° C.

Plaques have been molded from same composition for 5 minutes at 170° C., and then post-treated/post-cured in an air circulating oven at 200° C. for 8+16 hours. Mechanical properties were determined on specimens punched out from said plaques according to ASTM D412C at 23° C. The following properties were determined:

$M_{50}$ is the tensile strength in MPa at an elongation of 50%
$M_{100}$ is the tensile strength in MPa at an elongation of 100%
T.S. is the tensile strength in MPa;
E.B. is the elongation at break in %.

Results are summarized in the following table.

TABLE 1

| Ingredient | Ex. 1 | Ex. 2 | Ex. 3 | Ex. 4 | Ex. 5C | Ex. 6C | Ex. 7C |
|---|---|---|---|---|---|---|---|
| | Amounts in parts by weight | | | | | | |
| PFR95HT | 100 | 100 | 100 | 100 | 100 | 100 | 100 |
| CB-1 | 15 | 15 | 15 | 15 | 15 | 15 | 15 |
| CB-2 | 15 | 15 | 15 | 15 | 15 | 15 | 15 |
| C-1 | 1 | 0 | 0 | 0 | 0 | 0 | 1 |
| C-2 | 0 | 1 | 0 | 0 | 0 | 0 | 0 |
| C-3 | 0 | 0 | 1 | 0 | 0 | 0 | 0 |
| C-4 | 0 | 0 | 0 | 1 | 0 | 0 | 0 |
| P-1 | 1 | 1 | 1 | 1 | 1 | 0.75 | 0.75 |
| BO-1 | 1.5 | 1.5 | 1.5 | 1.5 | 1.5 | 0 | 0 |
| TAIC | 0 | 0 | 0 | 0 | 0 | 1.2 | 1.2 |
| C-Set on O-ring moulded 10 min at 170° C. and post-cured (8 + 16) h at 200° C. - C-set determined after 70 h at 300° C. | | | | | | | |
| C-Set (%) | 44 | 54 | 45 | 54 | 60 | >100 | >100 |
| Mechanical properties on punched specimens from plaques moulded 5 min at 170° C. and post-cured (8 + 16) h at 200° C. - determined at 23° C. | | | | | | | |
| T.S. (MPa) | 14.6 | 15.3 | 14.2 | 14.5 | 17.9 | 15.8 | 16.7 |
| $M_{50}$ (MPa) | 5.2 | 5.7 | 6.1 | 5.7 | 5.7 | 8.8 | 8.9 |
| $M_{100}$ (MPa) | 11.6 | 11.4 | 11.4 | 10.9 | 11.2 | 15.5 | 16.1 |
| E.B. (%) | 149 | 195 | 155 | 196 | 180 | 111 | 110 |

The data collected in Table 1 above well demonstrate a positive effect on C-set after compression at 300° C. when the composition comprises an organic compound, as above detailed, in combination with a bis-olefin as polyunsaturated crosslinking agent. C-set is found to be improved by 10 to 27%, which is a significant improvement, especially at these very harsh conditions (temperature of 300° C.). On the other side, the organic compounds are ineffective in delivering any improvement, when used in combination with other poly-unsaturated crosslinking agents, e.g. when using TAIC.

The invention claimed is:
1. A (per)fluoroelastomer composition comprising:
at least one (per)fluoroelastomer [fluoroelastomer (A)], said fluoroelastomer (A) comprising iodine and/or bromine atoms and having a backbone comprising:
recurring units derived from tetrafluoroethylene (TFE);
recurring units derived from at least one perfluorinated monomer selected from the group consisting of:
PAVE monomers, wherein the PAVE monomers are perfluoroalkylvinylethers complying with formula $CF_2=CFOR_{f1}$ in which $R_{f1}$ is a $C_1$-$C_6$ perfluoroalkyl; and
MOVE monomers, wherein the MOVE monomers are perfluoro-oxyalkylvinylethers complying with formula $CF_2=CFOX_0$, in which $X_0$ is (i) a $C_1$-$C_{12}$ perfluorooxyalkyl having one or more ether groups; or (ii) a group of formula -$CF_2OR_{f2}$ in which $R_{f2}$ is a $C_1$-$C_6$ perfluoroalkyl;
optionally, recurring units derived from vinylidene fluoride (VDF) in an amount of up to 30% by moles, with respect to the total moles of recurring units;
optionally, recurring units derived from at least one perfluorinated $C_3$-$C_8$ alpha-olefin, in an amount of up to 5% moles, with respect to the total moles of recurring units;
optionally, recurring units derived from at least one fluorine-free alpha-olefin, in an amount of up to 10% moles, with respect to the total moles of recurring units; and
optionally, recurring units derived from at least one bis-olefin [bis-olefin (OF)];
from 0.5 to 5 weight parts, per 100 parts by weight of said fluoroelastomer (A), of at least one polyunsaturated compound selected from the group consisting of bis-olefins of formulae (OF-1), (OF-2) and (OF-3):

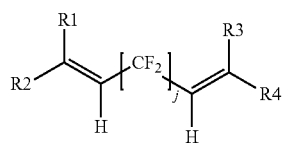
OF-1 wherein j is an integer between 2 and 10, and $R_1$, $R_2$, $R_3$, $R_4$, equal or different from each other, are H, F or $C_{1-5}$ alkyl or (per)fluoroalkyl-group;

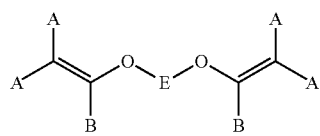
OF-2 wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atoms, optionally fluorinated, which may be inserted with ether linkages;

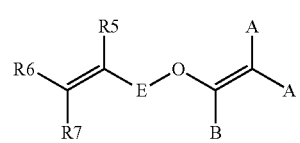
OF-3 wherein E, A and B have the same meaning as above defined; $R_5$, $R_6$, $R_7$, equal or different from each other, are H, F or $C_{1-5}$ alkyl or (per)fluoroalkyl group
from 0.1 to 3 weight parts, per 100 parts by weight of said fluoroelastomer (A), of at least one organic peroxide;
from 0.1 to 10 weight parts, per 100 parts by weight of said fluoroelastomer (A), of at least one organic compound [compound (C)] selected from the group consisting of:
urea compounds of formula (U):

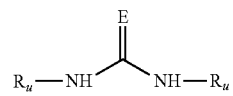

wherein E is O, and each of $R_u$, equal to or different from each other, is independently selected from the group consisting of hydrogen and $C_1$-$C_6$ hydrocarbon groups;
cyclic addition products of ammonia or primary amine and aldehyde; and
carbamates of formula (C):

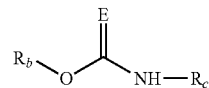

wherein E is oxygen; $R_b$ is a $C_1$-$C_{36}$ hydrocarbon group, and $R_c$ is H or a $C_1$-$C_6$ alkyl group.

2. The (per)fluoroelastomer composition of claim 1, wherein the polyunsaturated compound is present in the composition in an amount of at least 1 weight parts per 100 parts by weight of fluoroelastomer (A) and in an amount of less than 5 weight parts per 100 parts by weight of fluoroelastomer (A).

3. The (per)fluoroelastomer composition of claim 2, wherein the polyunsaturated compound is present in the composition in an amount of at least 1.2 weight parts per 100 parts by weight of fluoroelastomer (A) and/or in an amount of less than 4 weight parts per 100 parts by weight of fluoroelastomer (A).

4. The (per)fluoroelastomer composition of claim 3, wherein the polyunsaturated compound is present in the composition in an amount of less than 3 weight parts per 100 parts by weight of fluoroelastomer (A).

5. The (per)fluoroelastomer composition of claim 1, wherein fluoroelastomer (A) is selected from those having a backbone comprising:
recurring units derived from TFE in an amount of 30 to 70% moles;
recurring units derived from at least one perfluorinated monomer selected from the group consisting of PAVE monomers and MOVE monomers, in an amount of 25 to 40% moles;

optionally, recurring units derived from VDF in an amount of 1 to 25% moles;

optionally, recurring units derived from ethylene (E) in an amount from 0 to 5% moles;

optionally, recurring units derived from hexafluoropropylene (HFP) in an amount from 0 to 5% moles; and optionally, recurring units derived from at least one bis-olefin (OF).

6. The (per)fluoroelastomer composition of claim 5, wherein fluoroelastomer (A) is selected from the group consisting of fluoroelastomers having any of the following monomer compositions (in mol %):

(i) tetrafluoroethylene (TFE) 50-80%, perfluoroalkyl vinyl ethers (PAVE) 20-50%, bis- olefin (OF) 0-5%;

(ii) tetrafluoroethylene (TFE) 20-70%, perfluoro-oxyalkylvinylether (MOVE) 30- 80%, perfluoroalkyl vinyl ethers (PAVE) 0-50%, bis-olefin (OF) 0-5%;

(iii) tetrafluoroethylene (TFE) 40-70%, perfluoroalkyl vinyl ethers (PAVE) 20-50%, vinylidene fluoride (VDF): 10-30%; bis-olefin (OF): 0-5%; hexafluoropropylene (HFP): 0-5%; and (iv) tetrafluoroethylene (TFE) 40-69%, perfluoroalkyl vinyl ethers (PAVE) 20-49%, vinylidene fluoride (VDF): 10-30%; ethylene (E): 1-5%; bis-olefin (OF) 0-5%; hexafluoropropylene (HFP): 0-5%.

7. The (per)fluoroelastomer composition of claim 1, wherein the organic peroxide is selected from the group consisting of dialkyl peroxides.

8. The (per)fluoroelastomer composition of claim 7, wherein dialkyl peroxides are selected from di-tert-butyl peroxide, 2,5-dimethyl-2,5-bis(tert-butylperoxy)hexane, bis (1,1-diethylpropyl)peroxide, bis(1-ethyl -1-methylpropyl) peroxide, 1,1-diethylpropyl-1-ethy1-1-methylpropyl-peroxide, 2,5- dimethyl-2,5-bis(tert-amylperoxy)hexane; dicumyl peroxide; dibenzoyl peroxide; di-tert-butyl perbenzoate; and bis[1,3-dimethyl-3-(tert-butylperoxy)butyl] carbonate.

9. The (per)fluoroelastomer composition of claim 1, wherein the amount of the organic peroxide is at least 0.5 weight parts per 100 parts by weight of fluoroelastomer (A) and less than 3 weight parts per 100 parts by weight of fluoroelastomer (A).

10. The (per)fluoroelastomer composition of claim 9, wherein the amount of the organic peroxide is at least 0.8 weight parts per 100 parts by weight of fluoroelastomer (A) and/or less than 2.5 weight parts per 100 parts by weight of fluoroelastomer (A).

11. The (per)fluoroelastomer composition of claim 10, wherein the amount of the organic peroxide is at less than 2 weight parts per 100 parts by weight of fluoroelastomer (A).

12. The (per)fluoroelastomer composition of claim 1, wherein said urea compounds are selected from the group consisting of:

(i-A) ureas of formula (U-2):

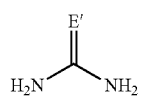

wherein E' is O; and/or wherein said cyclic addition products of ammonia or primary amine and aldehyde are selected from the group consisting of:

(ii-A) cyclic aldehyde adducts trimers of formula (T):

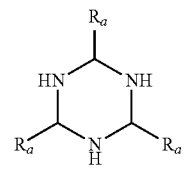

wherein each of $R_a$, equal to or different from each other, is selected from the group consisting of hydrogen and $C_1$-$C_6$ hydrocarbon groups; and (ii-B) hexamethylene tetramine of formula:

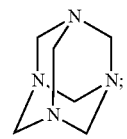

and/or wherein said carbamates are selected from the group consisting of: carbamates of formula (C-1):

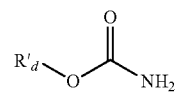

wherein $R'_d$ dis a $C_1$-$C_{36}$ hydrocarbon group.

13. The (per)fluoroelastomer composition of claim 1, wherein organic compound (C) is selected from the group consisting of:

(C-1) Urea of formula:

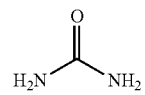

(C-2) Acetaldehyde ammonia trimer of formula:

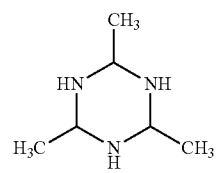

(C-3) Hexamethylenetetramine of formula:

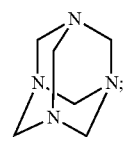

and (C-4) Benzyl carbamate of formula:

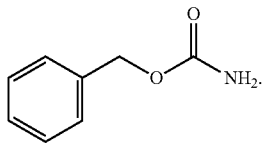 [SMILES: NC(=O)OCc1ccccc1]

14. The (per)fluoroelastomer composition of claim 1, wherein the amount of organic compound (C) is at least 0.2 weight parts per 100 parts by weight of fluoroelastomer (A) and/or less than 3 weight parts per 100 parts by weight of fluoroelastomer (A).

15. The (per)fluoroelastomer composition of claim 14, wherein the amount of organic compound (C) is at least 0.5 weight parts per 100 parts by weight of fluoroelastomer (A) and/or less than 2.5 weight parts per 100 parts by weight of fluoroelastomer (A).

16. The (per)fluoroelastomer composition of claim 15, wherein the amount of organic compound (C) is less than 2 weight parts per 100 parts by weight of fluoroelastomer (A).

17. The (per)fluoroelastomer composition of claim 1, wherein the (per)fluoroelastomer composition consists essentially of:
the at least one (per)fluoroelastomer [fluoroelastomer (A)], said fluoroelastomer (A) comprising iodine and/or bromine atoms and having a backbone comprising:
recurring units derived from tetrafluoroethylene (TFE);
recurring units derived from at least one perfluorinated monomer selected from the group consisting of:
PAVE monomers, wherein the PAVE monomers are perfluoroalkylvinylethers complying with formula $CF_2=CFOR_{f1}$ in which $R_{f1}$ is a $C_1$-$C_6$ perfluoroalkyl; and
MOVE monomers, wherein the MOVE monomers are perfluoro-oxyalkylvinylethers complying with formula $CF_2=CFOX_0$, in which $X_0$ is (i) a $C_1$-$C_{12}$ perfluorooxyalkyl having one or more ether groups; or (ii) a group of formula —$CF_2OR_{f2}$ in which $R_{f2}$ is a $C_1$-$C_6$ perfluoroalkyl;
optionally, recurring units derived from vinylidene fluoride (VDF) in an amount of up to 30% by moles, with respect to the total moles of recurring units;
optionally, recurring units derived from at least one perfluorinated $C_3$-$C_8$ alpha- olefin, in an amount of up to 5% moles, with respect to the total moles of recurring units;
optionally, recurring units derived from at least one fluorine-free alpha-olefin, in an amount of up to 10% moles, with respect to the total moles of recurring units; and
optionally, recurring units derived from at least one bis-olefin [bis-olefin (OF)];
from 0.5 to 5 weight parts, per 100 parts by weight of said fluoroelastomer (A), of the at least the one polyunsaturated compound selected from the group consisting of bis-olefins of formulae (OF-1), (OF-2) and (OF-3)
from 0.1 to 3 weight parts, per 100 parts by weight of said fluoroelastomer (A), of the at least one organic peroxide;
from 0.1 to 10 weight parts, per 100 parts by weight of said fluoroelastomer (A), of the at least one organic compound [compound (C)] selected from the group consisting of: urea compounds of formula (U), cyclic addition products of ammonia or primary amine and aldehyde; and carbamates of formula (C).

18. The (per)fluoroelastomer composition of claim 1, wherein the at least one (per)fluoroelastomer (A) comprises iodine and/or bromine atoms and having a backbone consisting essentially of:
recurring units derived from tetrafluoroethylene (TFE);
recurring units derived from at least one perfluorinated monomer selected from the group consisting of:
PAVE monomers, wherein the PAVE monomers are perfluoroalkylvinylethers complying with formula $CF_2=CFOR_{f1}$ in which $R_{f1}$ is a $C_1$-$C_6$ perfluoroalkyl; and
MOVE monomers, wherein the MOVE monomers are perfluoro-oxyalkylvinylethers complying with formula $CF_2=CFOX_0$, in which $X_0$ is (i) a $C_1$-$C_{12}$ perfluorooxyalkyl having one or more ether groups; or (ii) a group of formula —$CF_2OR_{f2}$ in which $R_{f2}$ is a $C_1$-$C_6$ perfluoroalkyl;
optionally, recurring units derived from vinylidene fluoride (VDF) in an amount of up to 30% by moles, with respect to the total moles of recurring units;
optionally, recurring units derived from at least one perfluorinated $C_3$-$C_8$ alpha-olefin, in an amount of up to 5% moles, with respect to the total moles of recurring units;
optionally, recurring units derived from at least one fluorine-free alpha-olefin, in an amount of up to 10% moles, with respect to the total moles of recurring units; and
optionally, recurring units derived from at least one bis-olefin [bis-olefin (OF)].

19. The (per)fluoroelastomer composition of claim 1, wherein the at least one organic compound (C) is selected from the group consisting of:
urea compounds of formula (U):

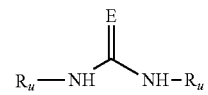

wherein E is O, and each of $R_u$, equal to or different from each other, is independently selected from the group consisting of hydrogen and $C_1$-$C_6$ hydrocarbon groups; and
carbamates of formula (C):

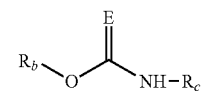

wherein E is oxygen; $R_b$ is a $C_1$-$C_{36}$ hydrocarbon group, and $R_c$ is H or a $C_1$-$C_6$ alkyl group;
optionally, a metal compound selected from the group consisting of (i) oxides and hydroxides of divalent metals, (ii) salts of a weak acid, and (iii) mixtures of (i) and (ii); and
optionally, at least one filler, thickener, pigment, antioxidants stabilizer, or processing aid.

20. The (per)fluoroelastomer composition of claim 1, wherein said urea compounds are selected from the group consisting of:

(i-A) ureas of formula (U-2):

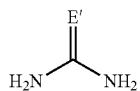

wherein E' is O;
(ii-B) hexamethylene tetramine of formula:

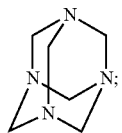

and/or
carbamates are selected from the group consisting of:
carbamates of formula (C-1):

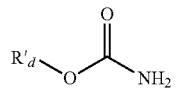

wherein $R'_d$ dis a $C_1$-$C_{36}$ hydrocarbon group.

21. The (per)fluoroelastomer composition of claim 1, wherein the wherein organic compound (C) is selected from the group consisting of:
(C-1) Urea of formula:

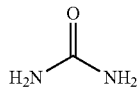

(C-3) Hexamethylenetetramine of formula:

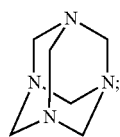

and
(C-4) Benzyl carbamate of formula:

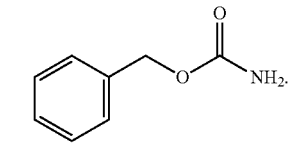 [SMILES: NC(=O)OCc1ccccc1]

22. A method for preparing a shaped article, the method comprising processing the fluoroelastomer composition according to claim 1 such that it is fabricated into a desired shape.

23. The method according to claim 22, wherein the fluoroelastomer composition fabricated into the desired shape is subjected to vulcanization, during the processing itself and/or in a subsequent step.

24. A cured article comprising the fluoroelastomer composition according to claim 1.

* * * * *

UNITED STATES PATENT AND TRADEMARK OFFICE
CERTIFICATE OF CORRECTION

PATENT NO. : 11,220,588 B2 Page 1 of 1
APPLICATION NO. : 15/578126
DATED : January 11, 2022
INVENTOR(S) : Matteo Fantoni et al.

It is certified that error appears in the above-identified patent and that said Letters Patent is hereby corrected as shown below:

In the Claims

At Column 14, Claim number 1, Line number 42, "$R_e$" should read -- $R_c$ --.

At Column 18, Claim number 19, Line number 58, "$R_e$" should read -- $R_c$ --.

At Column 19, Claim number 20, Line number 26, "dis" should read -- is --.

At Column 19, Claim number 21, Line number 28, "wherein the wherein" should read -- wherein the --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*